United States Patent [19]

Mitzmacher

[11] Patent Number: 4,877,924
[45] Date of Patent: Oct. 31, 1989

[54] ELECTRIC WIRE CONNECTOR WITH BUILT-IN STRIPPER AND STRIP GAUGE

[76] Inventor: Harry Mitzmacher, 59-10 Queens Blvd., Woodside, N.Y. 11377

[21] Appl. No.: 273,933

[22] Filed: Nov. 21, 1988

[51] Int. Cl.⁴ .......................... H01R 4/22; H02G 1/12
[52] U.S. Cl. ....................................... 174/87; 30/90.1; 439/577
[58] Field of Search ................... 174/87, 135, 138 F; 30/90.1; 81/9.4; 439/389, 443, 488, 577

[56] References Cited

U.S. PATENT DOCUMENTS

| | | | |
|---|---|---|---|
| 1,419,523 | 6/1922 | Schleper | 174/87 |
| 2,306,403 | 12/1942 | Mortensen | 30/90.1 |
| 2,984,905 | 5/1961 | Harmon | 30/90.1 |
| 3,124,021 | 3/1964 | Benander | 439/393 X |
| 3,417,368 | 12/1968 | Norden | 439/577 |

Primary Examiner—Laramie E. Askin

[57] ABSTRACT

An electric wire connector with a build-in wire stripper and strip guage for measuring and removing the correct depth and length of the insulation from the wire.

2 Claims, 1 Drawing Sheet

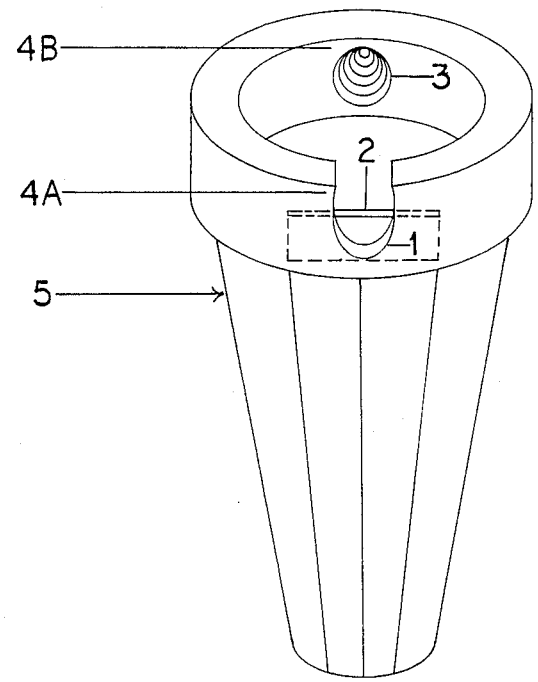

ELECTRIC WIRE CONNECTOR WITH BUILT-IN STRIPPER AND STRIP GAUGE

FIELD OF THE INVENTION

This invention relates to electric wire connectors that join two or more common size electric wires together.

BACKGROUND OF INVENTION

In order to use an ordinary wire connector, tools such as a knife, razorblade, wire stripper or cutting pliers must be employed to strip the insulation off the electric wire.

Care must be taken not to nick or cut into the copper conductor or other conductive core of the electric wire. Also, the exact length of insulation must be stripped off the electric wire.

It is thus apparent that a need exists for a wire connector with a built-in stripper and a strip guage.

Most other wire connectors in the prior art require tools to strip electric wire and care must be taken to avoid damaging the copper conductor.

OBJECTS AND ADVANTAGES OF THE INVENTION

Accordingly, an object of my invention is to employ the wire connector itself to strip just enough insulation off the electric wire.

Accordingly, an advantage of my invention is that no additional tools are needed to strip the insulation off the electric wire without nicks on the copper conductor.

Further objects and advantages of my invention will become apparent from a consideration of the drawing and ensuing description of it.

BRIEF DESCRIPTION OF THE DRAWING

Referring to the drawing, the single FIGURE is a perspective view of a wire connector according to the present invention.

DETAILED DESCRIPTION OF THE INVENTION

The wire connector, generally designated 5, comprises a hollow conically shaped body which is open at its large end for receiving the wires to be connected and which is closed at its small end. A circular rim wall 4A thicker than the conical wall of the body extends around the large end. A groove 1 is cut across the rim wall 4A of the wire connector 5. A sharp edged blade 2 is embedded into the rim wall 4A of the wire connector which crosses or intersects groove 1. A strip guage in the form of a concave recess, dent or dugout 3 is built into the inner part 4B of the wire connector rim wall just opposite groove 1 and the sharp edged blade 2.

What is claimed is:

1. An electric wire connector, comprising: a hollow conically shaped body which is open at its large end for receiving wires to be connected and which is closed at its small end, a circular rim wall thicker than the wall of the conically shaped body extending around the large open end of the conically shaped body, a groove extending across the circular rim wall, and a sharp edged blade embedded in the circular rim wall and extending across the groove, a portion of the sharp edged blade being exposed at the groove for stripping insulation off wires to be connected by the wire connector.

2. An electric wire connector in accordance with claim 1, further including a strip gauge, said strip gauge comprising a conical recess located in the interior of the circular rim wall diametrically opposite the groove and the sharp edged blade.

* * * * *